United States Patent Office 3,054,552
Patented Sept. 18, 1962

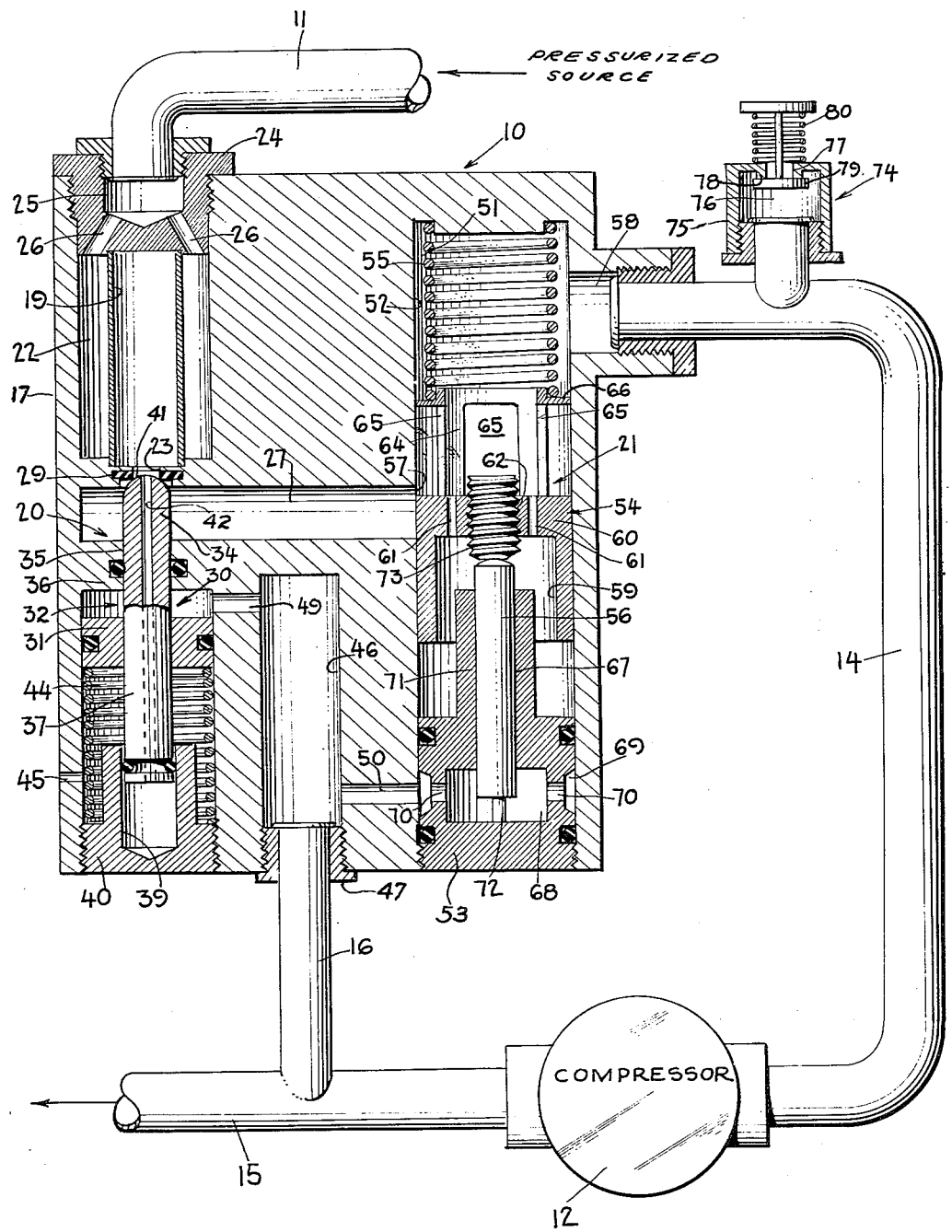

3,054,552
AIRBORNE COMPRESSOR SYSTEM
Ralph S. Doubleday, Passaic, and Alfred W. Siman, Elizabeth, N.J., assignors to Specialties Development Corporation, Belleville, N.J., a corporation of New Jersey
Filed July 17, 1958, Ser. No. 749,291
3 Claims. (Cl. 230—2)

This invention relates to compressor systems, and more particularly, to compressor systems in which the pressure of the inlet air delivered to the compressor is regulated.

In airborne air compressor systems, the weight of the compressor is an important factor and the size of the compressor needed depends upon the flow demand placed on the system. In order that a minimum size compressor may be used, it is essential that the designed output flow rate of the compressor be approximately equal to the flow demand and that the actual output flow rate of the compressor be maintained substantially constant at the designed value. Compressor systems installed in modern day aircraft must, therefore, be provided with a source of pressurized inlet air, since these aircraft operate at altitudes at which the ambient air is extremely thin and, if used as the inlet supply, would cause a considerable decrease in the flow rate of the compressor system.

In jet aircraft, it is common practice to use a portion of the engine bleed air as the inlet supply for the compressor system. The pressure of engine bleed air varies throughout the flight of the aircraft according to the power developed by the engine, therefore, if the output flow rate of the compressor system is to be constant, the pressure of the bleed air must be regulated before delivery to the compressor. In order that the system output be independent of the altitude at which the aircraft is operating, it is essential that the regulator used be insensitive to changes in ambient pressure. In the past, absolute pressure regulators have been used for this purpose. This type of regulator includes a spring loaded piston surface which forms one end of an evacuated bellows and is connected to a valve controlling the flow of inlet air to the compressor. The inlet air pressure downstream of this valve acts on the piston surface in opposition to the loading spring to partially close the valve if the inlet pressure increases. The evacuated bellows isolates the piston surface from ambient pressure thus preventing variations in ambient pressure from affecting the setting of the valve.

Regulators of this type, however, are not satisfactory in many respects partly because of the many disadvantages associated with the use of an evacuated bellows. In order that these bellows may withstand atmospheric pressure and still remain flexible, they are constructed of either thin metal sections which are soldered together or a thin metal cylinder which is formed with folds. They are, therefore, expensive to manufacture and develop leaks rapidly at the section joints or folds. These bellows are also sensitive to temperature since the metal walls expand and contract in response to temperature variations, therefore, in regulators using these devices the valve setting is varied by temperature changes.

Another disadvantage of this type of regulator lies in the fact that it provides a constant inlet pressure to the compressor regardless of the output of the compressor, therefore, any variation in the output pressure could not be sensed by the regulator and the output flow rate would vary accordingly.

Accordingly, it is an object of the present invention to provide a compressor system which maintains a constant output without the aforementioned disadvantages.

Another object is to provide a compressor system including a pressure regulator which controls the inlet pressure to a compressor in response to the pressure at the outlet of the compressor.

Another object is to provide a compressor system which delivers a constant output flow rate by maintaining the output pressure constant.

A further object is to provide a compressor system including a device for regulating the output pressure of the system which is simple, economical to manufacture, insensitive to temperature and ambient pressure, and has a long life.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing a compressor having an inlet and an outlet, conduit means for connection to a supply of gaseous medium having a variable pressure, and means connecting the conduit means and the inlet including means responsive to the pressure at the outlet for regulating the pressure at the inlet.

A preferred embodiment of the invention has been chosen for purposes of illustration and description, and is shown in the accompanying drawing, forming a part of the specification, wherein:

The single FIGURE of the drawing is a diagram of a compressor system in accordance with the present invention illustrating the pressure regulating device in longitudinal section.

Referring to the drawing in detail, there is shown a compressor system which generally comprises an inlet air controlling unit 10, a conduit 11 connecting the controlling unit and a source of pressurized air which may be a bleed air outlet on a jet engine, and a compressor 12 having an inlet connected to the controlling unit 10 by a conduit 14 and an outlet connected to the system to be pressurized (not shown) by a conduit 15 and to the unit 10 by a branch conduit 16.

The inlet air controlling unit 10 includes a body 17 and, a filter 19, a valve 20, and a pressure regulator 21 located in the body.

The filter 19 is tubular and is positioned coaxially in an open ended chamber 22 having an outlet port 23 in communication with the inner surface of the filter. The open end of the chamber 22 is closed by a nut 24 threaded therein and having a bore 25 for receiving the conduit 11 and ports 26 extending from the bore 25 to the portion of the chamber outwardly of the filter. A passageway 27 provides communication between the outlet port 23 and the pressure regulator 21.

The valve 20 includes a valve seat 29 provided in the filter outlet port 23 and a valve member 30 adapted to coact with the seat 29 to control the flow of air between the filter outlet port 23 and the passageway 27. The valve member 30 has a large diameter piston section 31 positioned within an open ended chamber 32, a small diameter section 34 extending through an opening 35 in a wall 36 separating the chamber 32 and the passageway 27, and a second small diameter section 37 extending into a bore 39 provided in a plug 40 threaded into the open end of the chamber 32. The section 34 has a larger diameter than that of the inner edge of the seat 29 and is provided at the end thereof with a hemispherical surface 41 for abutment with the seat 29. The section 37 is of the same diameter as the section 34, and an axial passageway 42 extends through the valve member 30 from the surface 41 to the bore 39. A spring 44 is provided in the chamber 32 between the piston section 31 and the plug 40 to urge the surface 41 against the seat 29, and a venting port 45 in the body 17 provides communication between the atmosphere and the portion of chamber 32 between the plug 40 and the valve member piston section 31. Suitable O rings are provided in the valve member sections 31 and 37, and in the wall 36 about the opening 35 to prevent leakage in the valve.

The branch conduit 16 from the compressor outlet is connected into a bore 46 in the body 17 by means of a nut 47. A passageway 49 provides communication between the bore 46 and the portions of the chamber 32 adjacent to the wall 36, and a second passageway 50 provides communication between the bore 46 and the pressure regulator 21.

The pressure regulator 21 includes a chamber 51 defined by a bore 52 and a plug 53 sealing the end of the bore, a flow throttling member 54 slidably mounted in the chamber 51, a spring 55 in the chamber 51 acting on the member 54, and a piston 56 slidably mounted in the plug 53 to act against the member 54 in opposition to the spring 55. The chamber 51 has an opening 57 in the side wall thereof at the point of intersection of the passageway 27 therewith, and the conduit 14 is connected to an outlet port 58 provided in the side wall of the chamber opposite the opening 57.

The throttling member 54 has a sleeve section 59 partially covering the opening 57, a wall section 60 transverse of the sleeve section and having ports 61 and a threaded bore 62 therein, a tubular section 64 of smaller diameter than the sleeve section extending from the wall section and having slots 65 therein, and a flange 66 on the free end of the tubular section for receiving the spring 55.

The plug 53 is threaded into the bore 52 and is provided with a bore 67 in which the piston 56 is mounted, a chamber 68 at the inner end of the bore 67, an annular recess 69 communicating with the passageway 50, and ports 70 extending from the recess 69 to the chamber 68. A reduced diameter section 71 of the plug 53 surrounds the outer portions of the bore 66 and extends into the sleeve section 59 of the member 54, and suitable O rings are provided on the plug to prevent leakage from the chamber 51. A projection 72 is provided on the end of the piston 56 within the chamber, and an adjusting screw 73 threaded into the bore 62 in the member 54 contacts the outer end of the piston 56.

A suction relief valve 74 is connected to the conduit 14 and includes a housing 75 defining a chamber 76 provided with an opening 77, with a valve seat 78 formed about the opening, a valve member 79, and a spring 80 normally urging the valve member 79 against the seat 78.

In operation, before the compressor 12 is started the inlet air controlling unit 10 is in the condition shown in the drawing with the valve member 30 held against the seat 29 by the spring 44, and the piston 56 held in its retracted position by the action of spring 55 against the member 54. When pressurized air is introduced into the conduit 11, for example by starting a jet engine, pressure builds up in the chamber 22 and is transmitted through the passageway 42 to the bore 39. Since the diameter of the section 37 is greater than that of the seat 29, the pressure in the bore 39 aids the spring in holding the surface 41 against the seat 29.

When the compressor 12 is started, it draws air from the conduit 14 creating a partial vacuum in the chamber 76 of the suction relief valve 74 thus causing the valve member 79 to move away from the seat 78 allowing ambient air to be drawn into the compressor. The pressure of the air flowing from the outlet of the compressor is transmitted through the conduit 16 to the bore 46 and through the passageway 49 to act on the piston section 31. As the pressure in conduit 15 builds up, the valve member 30 is moved away from the seat 29 allowing pressurized inlet air to flow through the opening 23 into the passageway 27 and through the opening 57 into the chamber 51. The pressurized air in chamber 51 flows through the outlet port 58 into the conduit 14 allowing the valve 74 to close, and also flows through the ports 61 in the throttling member wall 60 to balance the gaseous pressure acting on the throttling member 54.

The compressor outlet pressure is also transmitted from the bore 46 through the passageway 50, the annular recess 69, and the ports 70 into the chamber 68 to act on the piston 56. As the compressor outlet pressure increases, the piston 56 moves the throttling member 54 against the action of the spring 55 to decrease the effective area of the opening 57 thereby restricting the flow of inlet air into the chamber 51 and reducing the pressure of the air supplied to the compressor. The compressor 12 is driven at a constant speed and, therefore, has an output flow rate which is dependent only on the pressure at the outlet. The action of the member 54 reduces the pressure at the compressor inlet such that the outlet pressure is placed at a value corresponding to the desired flow rate. After the system has been placed in operation any increase or decrease in the compressor outlet pressure will result in the readjustment of the throttling member 54 to decrease or increase the inlet pressure at the compressor so that the outlet pressure returns to that value corresponding to the desired flow rate. It may be seen, therefore, that the outlet pressure and flow rate will be maintained substantially constant throughout the period during which the compressor is operating. It may further be seen that the operation of the regulator 21 is not affected by variations in ambient temperature or pressure.

While the outlet conduit 15 is described hereinabove as being connected to the compressed air utilizing system, the compressor 12 could be the first stage of a multi-stage compressor in which case the conduit 15 would be connected to the subsequent stage of the multi-stage compressor.

From the foregoing description, it will be seen that the present invention provides a compressor system which maintains a constant output and includes a simple, economical and durable regulating device which is insensitive to temperature and ambient pressure.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a system for supplying pressurized gaseous medium at a substantially constant output, the combination of compressor means having an inlet and an outlet, a source for supplying a gaseous medium having a pressure which is greater than ambient and is variable, fluid flow conducting means connecting said medium supplying means and said compressor means inlet, pressure regulating means in said fluid flow conducting means responsive only to the pressure at said compressor means outlet for regulating the pressure at said inlet, valve means in said fluid flow conducting means responsive to the pressure at said compressor means outlet for placing said medium supplying means and said compressor means inlet in fluid flow communication, and suction relief valve means in said fluid flow conducting means between said valve means and said compressor means inlet for providing ambient air to said compressor means inlet prior to the opening of said first mentioned valve means.

2. In a system for supplying pressurized gaseous medium at a substantially constant output, the combination of compressor means having an inlet and an outlet, a source for supplying a gaseous medium having a pressure which is greater than ambient and is variable, fluid flow conducting means connecting said medium supplying means and said compressor means inlet, pressure regulating means in said fluid flow conducting means responsive only to the pressure at said compressor means outlet for regulating the pressure at said inlet, valve means in said fluid flow conducting means constructed and arranged to open in response to the pressure present at said compressor means outlet when said compressor means is operating to place said medium supplying means and said compressor means inlet in fluid flow communication, and suction relief valve means in said fluid flow conducting means between said valve means and said compressor means inlet for providing ambient air to said compressor means inlet prior to the opening of said first mentioned valve means.

3. In a system for supplying pressurized gaseous medium at a substantially constant output, the combination of compressor means having an inlet and an outlet, a source for supplying a gaseous medium having a pressure which is greater than ambient and is variable, fluid flow conducting means connecting said gaseous medium supplying means and said compressor means inlet, pressure regulating means in said fluid flow conducting means responsive only to the pressure at said compressor means outlet for regulating the pressure at said inlet, said pressure regulating means comprising a casing having a chamber therein provided with an intake in fluid flow communication with said gaseous medium supplying means and provided with an output in fluid flow communication with said compressor means inlet, a member movably mounted in said casing to control the flow of gaseous medium into said chamber, passageway means arranged to place opposite surfaces of said member in fluid flow communication with each other to balance said member against the action of the pressure of the gaseous medium on one of the surfaces of said member, piston means adjacent said member for moving said member, and spring means acting on said member in opposition to said piston means, valve means in said casing for controlling the flow of gaseous medium to said intake, second spring means for normally holding said valve means closed, second piston means for opening said valve means, second fluid flow conducting means for providing a flow of gaseous medium from said compressor means outlet to said first and said second piston means to open said valve means and operate said regulating means when said compressor means is in operation, and suction relief valve means in said first fluid flow conducting means between said first mentioned valve means and said compressor means inlet.

References Cited in the file of this patent

UNITED STATES PATENTS

| | | |
|---|---|---|
| 1,025,222 | Wallace | May 7, 1912 |
| 2,295,833 | Deschamps | Sept. 15, 1942 |
| 2,324,236 | Price | July 13, 1943 |
| 2,342,219 | Price | Feb. 22, 1944 |
| 2,433,220 | Huber | Dec. 23, 1947 |
| 2,691,388 | Livers | Oct. 12, 1954 |
| 2,916,999 | Christenson | Dec. 15, 1959 |

FOREIGN PATENTS

| | | |
|---|---|---|
| 17,391 | Great Britain | 1911 |
| 285,910 | Great Britain | Apr. 19, 1928 |
| 561,464 | Great Britain | May 22, 1944 |